United States Patent
Mastie et al.

[19]

[11] Patent Number: 6,145,031
[45] Date of Patent: Nov. 7, 2000

[54] MULTIPLE INSERTION POINT QUEUE TO ORDER AND SELECT ELEMENTS TO BE PROCESSED

[75] Inventors: Scott David Mastie, Longmont; Ming Xie, Superior, both of Colo.

[73] Assignee: International Business Machines Corporation, Armonk, N.Y.

[21] Appl. No.: 09/140,482

[22] Filed: Aug. 26, 1998

[51] Int. Cl.[7] .................................................... G06F 13/00
[52] U.S. Cl. ............................................... 710/52; 710/40
[58] Field of Search .................................... 395/114, 115; 400/61; 710/5–7, 40–45, 52–57; 711/158

[56] References Cited

U.S. PATENT DOCUMENTS

| | | | |
|---|---|---|---|
| 5,327,526 | 7/1994 | Nomura et al. ........................ | 395/115 |
| 5,718,520 | 2/1998 | MacKay .................................. | 400/61 |
| 5,923,826 | 7/1999 | Grzenda et al. ....................... | 395/114 |
| 5,970,224 | 10/1999 | Salgado et al. ....................... | 395/115 |
| 6,000,001 | 12/1999 | Larson ................................... | 710/244 |
| 6,003,101 | 12/1999 | Williams ................................ | 710/112 |

*Primary Examiner*—Christopher B. Shin
*Attorney, Agent, or Firm*—David W. Victor; Konrad Raynes & Victor LLP

[57] ABSTRACT

Disclosed is a system for queuing elements, such as print jobs. A processing unit receives an element that is associated with a first factor and a second factor, such as data type and a priority within the data type, that indicates a priority of the element. For each first factor and second factor pair, an entry point addresses a point in the queue associated with the first factor and second factor. The processing unit locates an entry point addressing a point in the queue associated with a first factor and second factor that matches the first factor and second factor associated with the received element. The processing unit then inserts the received element in the queue at the entry point.

33 Claims, 4 Drawing Sheets

MULTIPLE INSERTION POINT QUEUE TO ORDER AND SELECT ELEMENTS TO BE PROCESSED

CROSS-REFERENCE TO RELATED APPLICATIONS

This application is related to the following co-pending and commonly-assigned patent applications, all of which are filed on the same date herewith, and all of which are incorporated herein by reference in their entirety:

"Load Balancing For Processing A Queue Of Print Jobs," Scott D. Mastie, Hongliang Tong, Ming Xie, Christopher B. Hirsch, attorney docket no. BO9-98-005;

"Selecting Printing Attribute Values in a Network Printing System," by Scott D. Mastie and Arthur R. Roberts, attorney docket no. BO9-98-006; and "Rule Based Selection Criteria For Controlling Print Job Distribution," by Scott D. Mastie and Ming Xie, attorney docket no. BO9-98-008.

BACKGROUND OF THE INVENTION

1. Field of the Invention

The present invention relates to a method and system for queuing elements and, in particular, for queuing print jobs to be processed and printed.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job. To route print jobs through a network printing system, International Business Machines Corporation (IBM) provides Printing Systems Manager (PSM) products that provide centralized and distributed management of a network printing system. The IBM PSM systems manage the flow of print jobs and insure that a print job is routed to a printer that can handle the job.

A print job is comprised of one or more electronically-stored files and the print attributes therefor. The print attributes inform the printer how to process the files. To assemble print jobs, prior art systems include software installed on the client computer that displays a graphical user interface (GUI). Using a mouse, keyboard, etc., the user selects from a menu of options displayed in the GUI the components and print attributes for a print job. The client computer, under control of the installed software, would then create an electronically-stored job ticket based on the information entered by the user.

Job tickets typically only define the print attributes for a single file. However, a document may be comprised of multiple files, each having one or more print attributes. A file submitted to the printer often includes printer instructions in a page description language (PDL) such as POST-SCRIPT™. POSTSCRIPT is a trademark of Adobe Systems, Incorporated. The PostScript language is used by many printers and applications to provide the complex fonts, graphics, and image handling capabilities required by today's applications. The PostScript language must be interpreted by a transform process in the printer or elsewhere in the network to produce a printed image file that is ready to be printed. Print image files are in a bitmapped image format, also known as a raster image. A raster image processor (RIP) translates PDL files to a raster image or RIP version of the file. In the desktop publishing environment, it can take several hours to transform a large PDL print file to its RIP version.

The IBM AIX® PRINT SERVICES FACILITY□/6000 (PSF/6000) software system transforms PostScript files into an Advanced Function Presentation data stream (AFP data stream) for printing on printers attached to a machine implementing the PSF/6000 software. AIX is a registered trademark of IBM and PRINT SERVICES FACILITY is a trademark of IBM. The PSF/6000 software uses the PS2AFP transform command to transform PostScript and other file formats into an AFP data stream file without submitting it immediately to the printer. The PS2AFP command runs as a daemon, which is a program that runs unattended in the background of the operating system. Daemon processes generally provide services that must be available at all times. A daemon runs continuously, looking for work to do, performing that work, and waiting for more work.

In prior art systems, including those that implement the ISO DPA 10175, POSIX 1387.4 and PSIS printing standards, such as the IBM Printer Resource Manager products, print jobs are received and queued at a single point before being routed to a virtual printer or printer that can handle the print job. Such a single point queue is sometimes referred to as a "spooler." Spoolers are servers that accept requests from many clients, validate job and document attributes with those of the intended print destination, provide queuing and scheduling, and then route jobs/documents to the appropriate printer. Scheduling jobs in the spooler is often based on FIFO, job size, or job identification. Queues are also used to queue jobs from one or more logical printers for distribution to physical pritners. Current queues often select print jobs of lower priority over print jobs of higher priority to print. Thus, there is a need in the art for an improved method and system for selecting print jobs.

SUMMARY OF THE PREFERRED EMBODIMENTS

To overcome the limitations in the prior art described above, preferred embodiments disclose a system for queuing elements. A processing unit receives an element that is associated with a first factor and a second factor, and possibly additional factors, that indicates a priority of the element. For each first factor and second factor pair, an entry point addresses a point in the queue associated with the first factor and second factor. The processing unit locates an entry point addressing a point in the queue associated with a first factor and second factor that matches the first factor and second factor associated with the received element. The processing unit then inserts the received element in the queue at the entry point.

In further embodiments, an exit point addresses an element in the queue according to the priority of the elements in the queue. The processing unit processes a request for an element from the queue and accesses the element addressed by the exit point to return to the request.

In yet further embodiments the elements in the queue may be comprised of print jobs and the queue may be used to queue print jobs in a printing system. The queue may be used to select and distribute elements to transform processes to transform the element to an output data stream capable of being read by a printer. Alternatively, the elements may be printer ready output data streams and the queue may be used to select an output data stream that is transferred to a logical printer queue. Still further, the queue may be a logical printer queue that spools output data streams to a physical printer associated with the logical printer.

Current queues and spoolers that rely on FIFO or other queueing ordering can allow high priority tasks to remain queued while lower priority tasks are processed first. Further delays in processing high priority tasks result if the lower priority print job tasks selected off the queue first are considerably large. Thus, current spooling and queuing techniques do not insure that queued jobs are ordered according to priority rankings.

Preferred embodiments provide a method and system for queuing print jobs according to at least two priority factors and inserting elements in the queue at one of many entry points. In this way, the queue may order elements according to at least two levels (factors) of priority wherein elements having the same first priority factor that is higher priority than the first priority factors of other elements are selected from the queue first. Within a group of elements having the same first priority factor, elements having a second priority factor that is of higher priority than the second priority factor of other elements having the same first priority factor are selected from the queue first. The queues of the preferred embodiments insure that elements, such as print jobs, data, and other tasks, of a specified priority indicated by at least two priority factors are processed first.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Hardware and Software Environment

Figure 1:
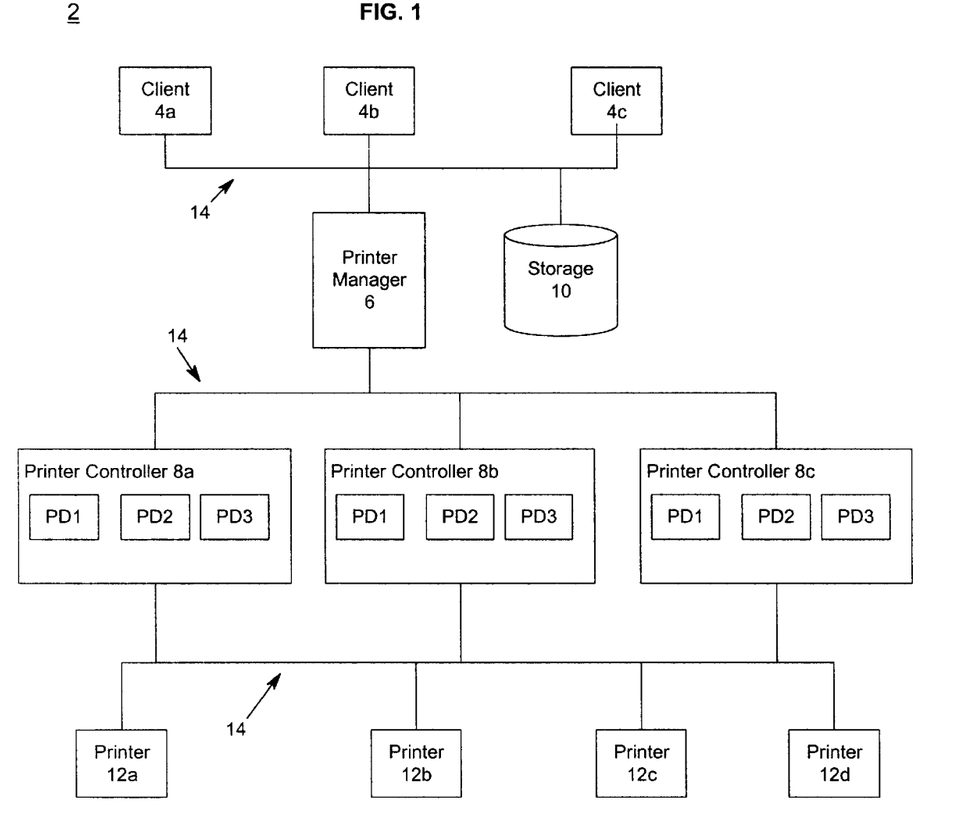
FIG. 1 is a block diagram illustrating a software and hardware environment in which preferred embodiments of the present invention are implemented.

FIG. 1 illustrates a preferred hardware and software environment in which preferred embodiments of the present invention are implemented. A network printing system 2 is comprised of a plurality of client computers 4a, b, c connected to a printer manager 6, which routes print jobs received from the clients 4a, b, c to one of a plurality of printer controllers 8a, b, c. The clients 4a, b, c and the printer manager 6 may access a storage device 10 which may store various printer related files. The printer controllers 8a, b, c are each capable of executing multiple instances of printer daemons PD1, PD2, PD3. Each printer daemon (PD) can transform an input data file to a format that may be processed by the printer. For instance, if the print job was a PostScript file, then the printer daemon (PD) would transform the PostScript file to a RIP image file. The IBM PS2AFP daemon program performs such a transformation. The printer daemons (PD) executing in multiple printer controllers 8a, b, c may be capable of simultaneously transforming different types of input data streams, e.g., PostScript, ditroff, PCL™, TeX, etc. PCL is a trademark of the Hewlett-Packard Company. The printer daemons in the controllers 8a, b, c then transfer the processed data file to one of several printers 12a, b, c, d through a backend program that selects the printer. The printers 12a, b, c, d may be any suitable printer machine known in the art, such as the IBM INFOPRINT™ series of printers. INFOPRINT is a trademark of IBM.

A network system 14 links the clients 4a, b, c to the printer manager 6 and storage device 10, the printer manager 6 to the printer controllers 8a, b, c, and the printer controllers 8a, b, c, to the printers 12a, b, c, d. The network 14 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the clients 4a, b, c, and the printer manager 6, and the printer controllers 8a, b, c and the printers 12a, b, c, d. In preferred embodiments, the network printing system 2 employs a distributed file system (DFS), which allows storage and retrieval of data throughout the network printing system 2.

The printer manager 6 may be a separate stand alone server including an operating system such as AIX®, OS/390™, UNIX®, OS/2®, MVS™, WINDOWS®, etc. AIX and OS/2 are registered trademarks of IBM and OS/390 and MVS are trademarks of IBM; WINDOWS is a registered trademark of Microsoft Corporation; UNIX is a registered trademark licensed by the X/Open Company LTD. The clients 4a, b, c may be any computer system known in the art including software to submit print jobs to the printer manager 6. The storage device 10 may be any suitable nonvolatile storage device, such as a direct access storage device (DASD), automated tape library (ATL), holographic units, etc., capable of storing print files. The clients 4a, b, c may build print jobs that include print files, such as PostScript files, maintained in the storage device 10. The printer controllers 8a, b, c may be printer controllers capable of executing multiple instances of printer daemons, such as the IBM Multiple Printer Controllers (MPC) software that runs on the IBM RS/6000® server under the AIX operating system. RS/6000 is a registered trademark of IBM. The MPC software dedicates a portion of the server processor cycles to each instance of a printer daemon that transforms data to a print image. A RIP is often considered as the transform process of a PostScript file to a bit map file. The term RIP is used herein interchangeably with transform process and printer daemon (PD) to refer to any type of transform process regardless of the format of the file being transformed to a printer readable format, i.e., bitmap file. The terms RIP, RIPper, RIPped, and RIPping all refer to a particular stage or instance of a RIP transform process. As used herein the term "print job" refers to a print job that needs to be RIPped or otherwise transformed. The concurrent execution of multiple print daemons is embodied in current IBM MPC and IBM PSF/6000 software products, described in IBM publications "PSF/6000: Print Submission," document no. S544-3878-01 (Copyright IBM Corp. 1993, 1994); "PSF/6000: Print Administration," document no. S5443817-01 (Copyright IBM Corp. 1993, 1994); "IBM Print OnDemand User Guide," document no. G544-

5325-00, (Copyright IBM Corp. 1996), all of which IBM publications are incorporated herein by reference in their entirety. The printer manager 6 and printer controllers 8a, b, c would include further logic to implement the preferred embodiments of the present invention.

Each of the devices in the network 2 has a unique IP address. Moreover, each printer daemon (PD) in the printer controllers 8a, b, c may be associated with a port address. The combination of the IP address of the printer controller 8a, b, c and the port address therein provides a unique address for the printer daemon (PD). The printer manager 6 may use this unique printer daemon (PD) address to route a print job to a specific instance of one of many printer daemons executing in the printer controllers 8a, b, c.

Thus, the preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The Print Queue

Preferred embodiments concern a print queue that queues pointers to a file to be processed, such as print jobs, tasks, data or any other program element, which must be queued before proceeding to another process. In this way, network traffic is reduced because the actual files do not have to be transferred to and from the queue because a pointer to the file in the network is the queued element. In further embodiments, the preferred queues may queue the actual data, e.g., print file, file or task, that will be processed. Thus, the print queue of the preferred embodiments may queue any element relating to a file, whether that element is a pointer to the related file, a token or transaction ID for the related file, or the actual task or file itself.

Figure 2:
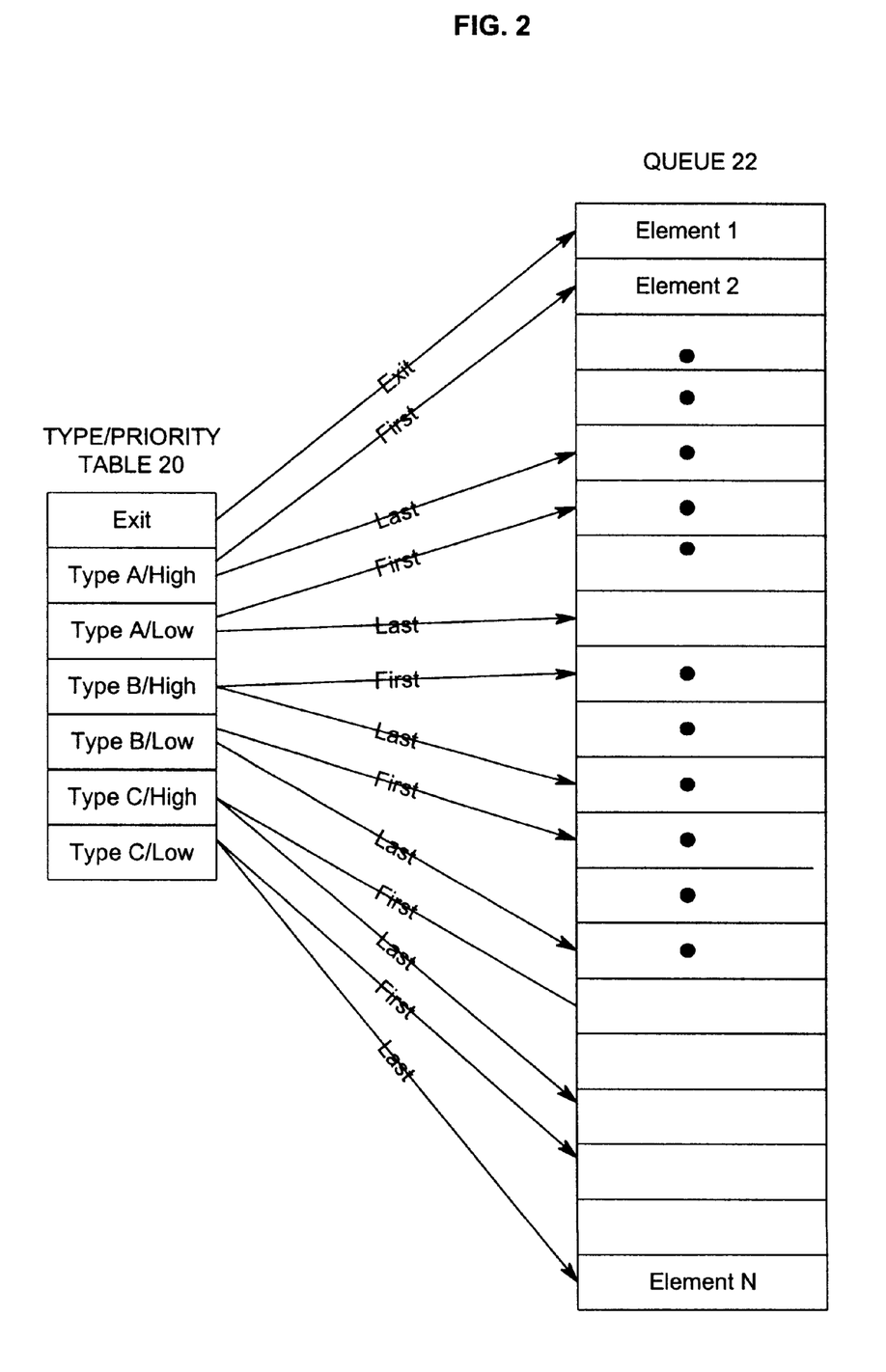
FIG. 2 illustrates a data structure for a queue and related table in accordance with preferred embodiments of the present invention.

FIG. 2 illustrates a preferred embodiment table 20 and queue 22. The illustrated table 20 includes two enumerated priority types, a type value and a priority value. In the exemplar of FIG. 2 there are three types, Type A, B, C and two possible priorities for an element of a particular type, i.e., high or low. For instance, a print job type may include overdue bills, monthly invoices, and batch overnight. A particular print job of a certain type may also be categorized as having a high or low priority. The user would specify the type and priority when creating the print job.

Each entry in the table 20 provides a pointer to an entry in the queue 22. When an element is received, the priority and type of the received element is determined. The table 20 could be scanned to locate an entry matching the type and priority for the received element. The pointers at each entry in the table 20 address the first and last entry for elements in the queue 22 of a particular type and priority. All elements of a particular type and priority between the first and last entry may be ordered in the queue on a first-in-first-out (FIFO) basis. For instance, the Type A/High entry in the table 20 has two pointers, a "first" pointer addressing the first element of Type A and high priority and a last pointer addressing the last element of Type A and high priority.

Similarly, the Type B/low entry in the table 20 includes pointers addressing the first and last tracks entered into the queue of Type B and low priority. The exit entry in the table 20 addresses the entry in the queue 22 that will be processed next in the queue. Thus, the queue has multiple entry points addressed by the different first and last pointers and a single exit.

In certain embodiments, an element may be inserted into the queue and ordered in the queue behind the element at an entry point addressed by the "last" pointer. As discussed, a queued element may be a pointer or reference to a file or the actual file itself. In such case, the entry point is the "last" pointer. The "last" pointer is selected from the table 20 entry having the same type and priority of the element to be inserted. The pointers labeled "first" address a first entry in the queue 22 of a particular type and priority. The "first" pointers may be used to select an entry from the queue 22 of a particular type and priority. When the "first" pointer addresses the first element of a type and priority added to a queue and the "last" pointer addresses the last element of a type and priority added, then the queue 22 employs a first-in-first-out (FIFO) structure within a particular type and priority. In alternative embodiments, the exit pointer may be determined from the "last" pointer, providing a last-in-first-out ordering of the queue 22. Still further, the entry point for a type and priority may be the "first" pointer at the entry in the table 20 or some element between the first and last elements of a particular type and priority added to the queue 22.

Figure 3A:
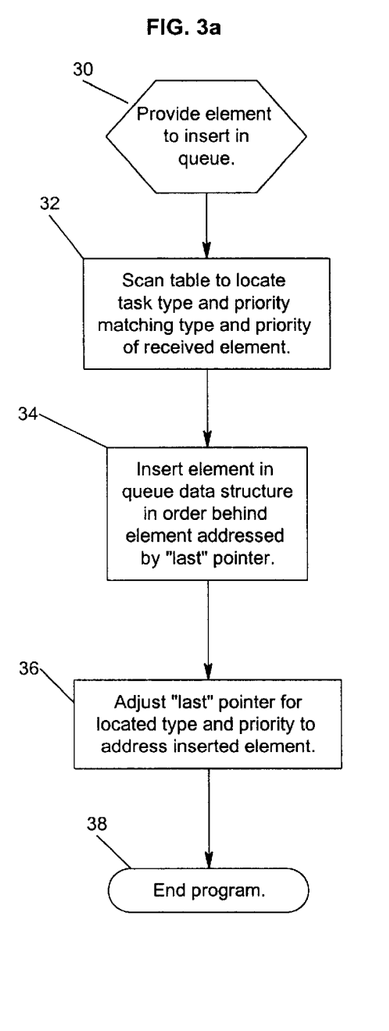
FIGS. 3a, b are flowcharts for inserting and selecting elements from the queue in accordance with preferred embodiments of the present invention.
Figure 3B:
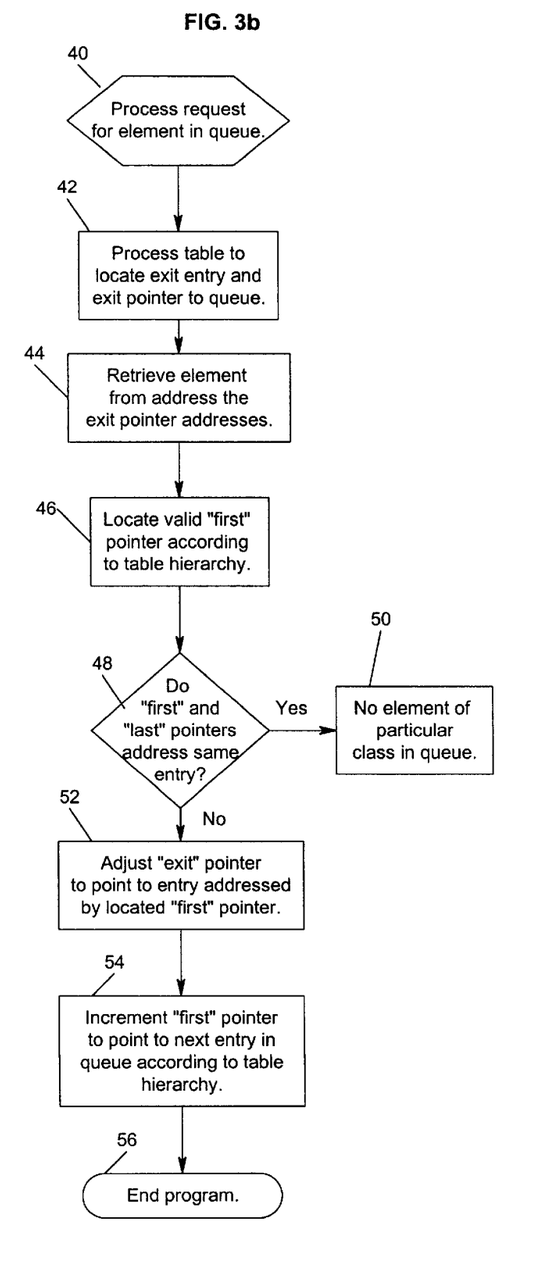

FIGS. 3a, b illustrate preferred logic to enter and remove elements from the queue. With respect to FIG. 3a, control begins at block 30 which represents a processor managing the queue 22 receiving an element (e.g., pointer to a file or file) to insert in the queue 22. The processor may be any processing unit, including the printer manager 6, the printer controllers 8a, b, c or a processing unit in the printers 12a, b, c, d. Control transfers to block 32 which represents the processor scanning the table 20 to locate the entry for the element type and priority matching the type and priority of the received element. Control then transfers to block 34 which represents the processor inserting the received element in the queue data structure in an order behind the element addressed by the "last" pointer. Control transfers to block 36 which represents the processor adjusting the "last" pointer for the located type and priority to address the element just inserted in the queue. The processor may also modify the queue 22 data structure to indicate that the inserted element follows the previous element addressed by the "last" pointer. Control transfers to block 38 to end the program.

With the logic of FIG. 3a, elements of a particular type and priority are ordered on a FIFO basis because a new element is inserted in the data structure in an order in the queue behind the "last" element of the particular type and priority. The queue data 22 structure may further include a pointer with the element entries pointing to the element of the same type and priority following in the FIFO queue ordering.

FIG. 3b illustrates logic to retrieve or pull an element from the queue 22.

Control begins at block 40 which represents the processor processing a request for a file, task, etc. in the queue 22. Control transfers to block 42 which represents the processor processing the table 20 to locate the exit entry in the table 20 and the corresponding exit pointer. Control transfers to block 44 which represents the processor retrieving the element addressed by the exit pointer. Control then transfers to block 46 where the processor locates the highest ordered "first" pointer addressing a valid entry according to the table 20 hierarchy. In preferred embodiments, the table 20 may reflect the queue 22 hierarchy according to the type and priority values. In such case, the processor may access the element located at block 46 by considering "first" pointer entries in the table in the type/priority order of the entries. If the "first" pointer for a table 20 entry does not address a valid element, then the processor would proceed to the table 20 entry for the type/priority that is the next type in the queue 22 hierarchy, e.g., from Type A to B. As discussed, the table hierarchy may arrange entries first according to type, e.g., Type A, B, C, then within a type according to priority, e.g., high low.

Control transfers to block 48 which represents the processor determining whether the located "first" pointer and corresponding "last" pointer address the same entry. If so, control transfers to block 50, which represents the state where there are no elements of a particular class in the queue. If the "first" and "last" pointers address different entries, then control transfers to block 52 which represents the processor adjusting the "exit" pointer to address the entry addressed by the located "first" pointer. Control then transfers to block 54 which represents the processor adjusting the "first" pointer to point to the next element in the queue according to the queue ordering elements within a particular type and priority. As discussed, the queue entries may include a pointer to the next entry having the same type and priority that was added after the pointing entry. From block 54, control ends at block 56.

With the logic of FIGS. 3a, b, queued entries are ordered according to two enumerated types, such as type and priority, which determines how elements are added and removed from the queue.

Using the Queue in a Network Printing System

The queue of FIG. 2 may be used to queue print jobs. For instance, the queue 20 may have three enumerated types of jobs, e.g., overdue bills, monthly invoices, and batch processing. A priority may also be determined among the different types of print jobs. For instance, overdue bills may have higher priority than monthly invoices and batch processing, and monthly invoices may have higher priority than batch processing. A second enumerated type indicates a priority value for print jobs of the same data type. The user may indicate the print job type and the priority, e.g., high or low, when creating the print job.

The queue 22 may be employed at different locations in the network printing system 2. The queue 22 can be implemented in the printer manager 2 to select print jobs to RIP as described in related IBM patent application "Load Balancing For Processing A Queue Of Print Jobs," attorney docket no. BO9-98-005, which application was incorporated herein by reference in its entirety above. In such case, the printer manager 6 would place received jobs in the queue 22 according to the type and priority of the job. When a RIPper becomes available, the printer manager 6 would select a print job from the exit of the queue 22 to RIP.

Alternatively, the preferred queue structure may be employed within a printer controller 8a, b, c to queue RIPped print jobs before the RIPped print job is transferred to a logical printer queue. A logical printer groups physical printers that share a common set of print attributes and can print print jobs having such common set of print attributes in a consistent manner. Typically logical printers are associated with a single queue that spools the RIPped print jobs to one of the physical printers associated with the logical printer. After a print job is RIPped, a logical printer having print attributes matching the print attributes for the RIPped job is selected. The RiPped print job is then routed to the queue associated with the logical printer. The RIPped job is queued until a physical printer related to the logical printer becomes available. In other words, a logical printer provides a grouping and queue for a set of physical printers having common, compatible printer attributes. In preferred embodiments, each printer controller 8a, b, c maintains one or more logical printer queues associated with printers 12a, b, c, d attached to the printer controller 8a, b, c in which the logical printer queue is maintained.

Each printer controller 8a, b, c may include the preferred embodiment queue 22 to queue RIPped print jobs before a logical printer is selected to handle the print job. The printer controller 8a, b, c would queue print jobs RIPped by the print daemons (PD) in a queue 22 within the controller 8a, b, c including the print daemon (PD) used to RIP the job. The printer controller 8a, b, c would access the exit entry in the queue 22 and determine if there was an enabled logical printer to handle the queued print job. If there was no enabled logical printer compatible with the queued print job, then the printer controller 8a, b, c would leave the RIPped print job in the queue. The printer controller 8a, b, c would then scan the queue 22 according to the hierarchical FIFO ordering of elements in the queue to locate the first available RIPped print job for which there is an available logical printer. An available logical printer has a physical printer that is available. The printer controller 8a, b, c would then route the print job to the logical printer which would spool the RIPped print job to an available physical printer associated with the logical printer. Criteria for selecting an appropriate physical printer from the physical printers associated with the selected logical printer are described in related U.S. patent application "Rule Based Selection Criteria For Controlling Print Job Distribution," attorney docket no. BO9-98-008, which application was incorporated herein by reference above.

Leaving the RIPped print job in the preferred embodiment queue if there are no available logical printers avoids the situation of routing the RIPped print job to a queue associated with a disabled logical printer and then having to reroute the print job to another logical printer queue in another printer controller 8a, b, c. With the preferred embodiments, network traffic is reduced because RIPped print jobs are only routed to logical printers having an available physical printer thereby avoiding the situation where the print job must be rerouted to another logical printer queue maintained in another printer controller 8a, b, c should the initially selected logical printer be unable to handle the job.

Figure 4A:
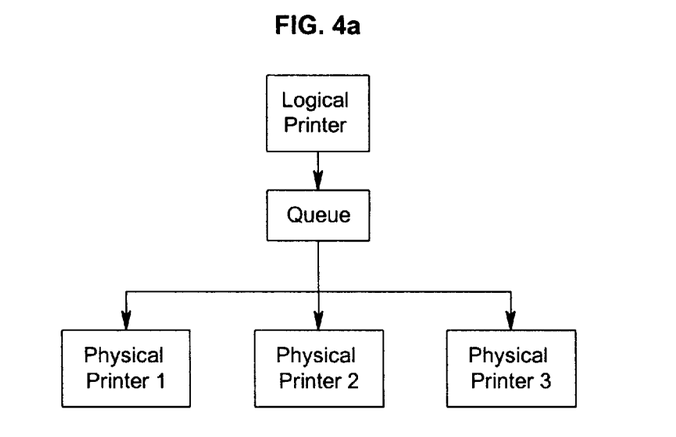
FIGS. 4a, b, c illustrate alternative arrangements for a queue that queues print jobs from one or more logical printers being sent to one or more physical printers.
Figure 4B:
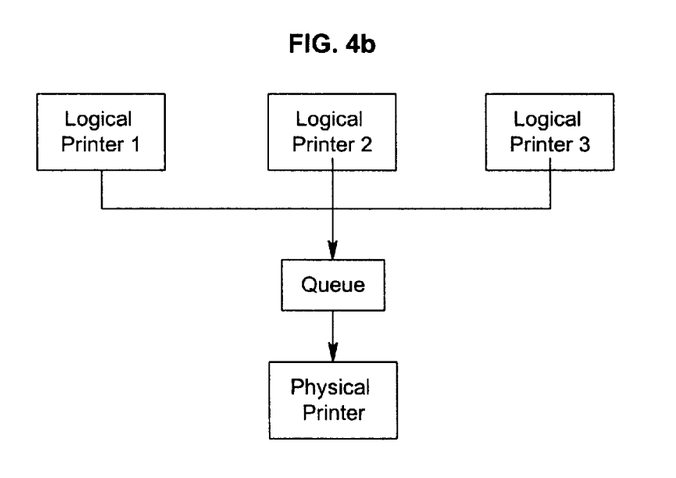
Figure 4C:
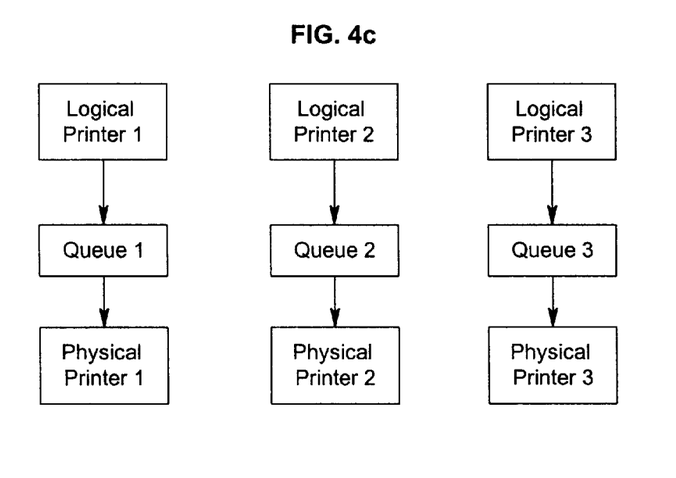

The preferred embodiment queue 22 can also be used as the logical printer queue to route print jobs to a physical printer associated with the logical printer. FIGS. 4a, b, c illustrate different configurations of logical printers, logical printer queues, and physical printers. In each of the embodiments of FIGS. 4a, b, c, the queue(s) may be the preferred embodiment queue 22. In FIG. 4a, the queue 22 queues RIPped print jobs from a single logical printer to one of many physical printers. In FIG. 4b, a single queue 22 queues RIPped print jobs from multiple logical printers which are then submitted to a single physical printer in a funnel configuration. FIG. 4c illustrates an hourglass configuration of a many to many relationship of logical printers to queues to physical printers.

Conclusion

This concludes the description of the preferred embodiments of the invention. The following describes some alternative embodiments for accomplishing the present invention.

The preferred queue was described as having three element types and two priorities. In alternative embodiments, there may be more types and priority values.

In such case, additional entries in the table 20 would be needed. Moreover, the elements in the queue may be any type of data, task or program element.

The queue of the preferred embodiment is described as queuing print jobs according to type of print job and priority and according to a FIFO ordering. In alternative embodiments any ordering scheme could be used to order elements in the queue. The preferred embodiment queue was described for use to route print jobs to print daemons for RIPping, to rout RIPped jobs to an available logical printer, and/or to queue and route RIPped print jobs for a logical printer to an associated physical printer. However, those skilled in the art will appreciate that the queue of the present invention may be used to queue any type of data or computer task and is not limited to printing tasks.

The printer manager 6 and printer controllers 8a, b, c are described as implemented in separate server machines networked together. In alternative embodiments, functions performed by the printer manager 6 may be implemented within one or more printer controllers 8a, b, c. Moreover, each printer controller 8a, b, c, may be capable of implementing more or less print daemons than the three print daemons illustrated in the preferred embodiment. In yet further embodiments, the printer manager and printer controllers 8a, b, c may be implemented as software programs within a single server.

The logic of FIGS. 3a, b is for illustrative purposes. Additional or alternative steps may be performed in addition to those illustrated in the logic. Further, the order of the steps in the preferred logic may also vary.

In summary, preferred embodiments in accordance with the present invention provide a system for queuing elements. A processing unit receives an element that is associated with a first factor and a second factor that indicates a priority of the element. For each first factor and second factor pair, an entry point addresses a point in the queue associated with the first factor and second factor. The processing unit locates an entry point addressing a point in the queue associated with a first factor and second factor that matches the first factor and second factor associated with the received element. The processing unit then inserts the received element in the queue at the entry point.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for queuing elements, comprising:

receiving an element related to a file associated with a first factor and a second factor that indicates a priority of the element, wherein the element is a member of a set of elements consisting of a pointer to a file, a token reference to a file and a file;

providing entry points to a queue of elements, wherein for each first factor and second factor pair, an entry point addresses a point in the queue associated with the first factor and second factor;

locating an entry point addressing a point in the queue associate with a first factor and second factor that matches the first factor and second factor associated with the received element; and inserting the received element in the queue at the entry point.

2. The method of claim 1, wherein the received elements are associated with additional factors, wherein for each additional factor, an entry point addresses a point in the queue.

3. The method of claim 1, further comprising the steps of:

providing an exit point that addresses an element in the queue according to the priority of the elements in the queue;

processing a request for an element from the queue; and accessing the element addressed by the exit point to return to the request.

4. The method of claim 1, wherein the first factor comprises a data type and the second factor comprises a priority within the data type, and wherein a priority ordering indicates the priority among the data types.

5. The method of claim 4, wherein the exit point addresses an element having a highest priority data type of the elements in the queue and having a highest priority factor of the elements in the queue of the same data type, further comprising the steps of:

determining an element in the queue by performing the steps of:

(i) determining whether there is an element in the queue having the same data type as the accessed element;

(ii) determining an element in the queue having a data type that is lower priority than the data type of the accessed element after determining that there is no element in the queue having the same data type as the accessed object;

(iii) determining whether there is an element in the queue having the same priority factor as the accessed element after determining that there is an element in the queue having the same data type as the accessed element;

(iv) determining an element in the queue having the same data type and priority factor as the accessed element after determining that there is an element in the queue having the data type of the accessed element; and (v) determining an element in the queue having the same data type and lower priority factor than the accessed element after determining that there is no element in the queue having the same data type and priority factor as the accessed element; and modifying the exit point to address the determined element.

6. The method of claim 1, wherein the step of providing entry points further comprises providing a table including an entry for each first factor and second factor pair, wherein there is at least a one-to-one correspondence between entries in the table and entry points in the queue for each first and second factor pair, and wherein the step of locating the entry point comprises locating the entry in the table corresponding to the first and second factor pair and determining the pointer for the located table entry addressing the entry point in the queue.

7. The method of claim 6, wherein the step of inserting the received element in the queue comprises:

determining the table entry point for the first and second factor pair associated with the received data;

inserting the received element at the point in the queue addressed by the pointer for the determined table entry point; and modifying the pointer for the determined table entry point to address the inserted element.

8. The method of claim 1, wherein the elements in the queue comprise pointers to print files, wherein the print job to which the element points has not been transformed into an output data stream capable of being read by a printer, further comprising the steps of:

determining whether a transform process is available;

accessing an element in the queue after determining the availability of a transform process;

processing the element to locate the print file to which the element points;

transmitting the located print file to the available transform process to transform the print file into an output data stream; and transmitting the output data stream to a printer for printing.

9. The method of claim 1, wherein the elements in the queue comprise pointers to output data streams that are the result of a transform process on a print file, further comprising the steps of:

accessing an element in the queue according to the priority indicated by the first and second factors;

determining a logical printer having a set of print attributes compatible with print attributes of the accessed element, wherein the logical printer groups physical printers having a common set of print attributes;

determining whether a physical printer grouped by the logical printer is available;

processing the element to locate the output data stream to which the element points; and transferring the located output data stream to a logical printer queue after determining that a physical printer grouped by the logical printer is available.

10. The method of claim 1, wherein the elements comprise pointers to output data streams that are the result of a transform process on a print file, wherein the queue is a logical printer queue, and wherein a logical printer groups physical printers having a common set of print attributes, further comprising the steps of:

determining whether a physical printer grouped by the logical printer is available;

accessing an element in the logical printer queue after determining the availability of a physical printer;

processing the element to locate the output data stream to which the element points; and transferring the output data stream to the physical printer for printing.

11. A system for processing elements, comprising:

a processing unit;

a memory device for access by the processing unit including data structures accessible to the processing unit, the data structures comprising:

(i) a queue of elements, wherein each element is associated with a first factor and a second factor that indicates a priority of the element, and wherein the element is a member of a set of elements consisting of a pointer to a file, a token reference to a file and a file;

(ii) entry points to elements in the queue, wherein for each first factor and second factor pair, an entry point addresses a point in the queue associated with the first factor and second factor;

program logic executed by the processing unit, including:

(i) means for receiving an element;

(ii) means for locating an entry point addressing a point in the queue associated with a first factor and second factor that matches the first factor and second factor associated with the received element; and (iii) means for inserting the received element in the queue at the entry point.

12. The system of claim 11, wherein the received elements are associated with additional factors, wherein for each additional factor, an entry point addresses a point in the queue.

13. The system of claim 11, wherein the data structrues in the memory device further comprise an exit point that addresses an element in the queue according to the priority of the elements in the queue, and wherein the program logic further includes:

means for processing a request for a element from the queue; and means for accessing the element addressed by the exit point to return to the request.

14. The system of claim 11, wherein the first factor comprises a data type and the second factor comprises a priority within the data type, and wherein a priority ordering indicates the priority among the data types.

15. The system of claim 14, wherein the exit point addresses an element having a highest priority data type of the elements in the queue and having a highest priority factor of the elements in the queue of the same data type, wherein the program logic determines an element in the queue by:

(i) determining whether there is an element in the queue having the same data type as the accessed element;

(ii) determining an element in the queue having a data type that is lower priority than the data type of the accessed element after determining that there is no element in the queue having the same data type as the accessed object;

(iii) determining whether there is an element in the queue having the same priority factor as the accessed element after determining that there is an element in the queue having the same data type as the accessed element;

(iv) determining an element in the queue having the same data type and priority factor as the accessed element after determining that there is an element in the queue having the data type of the accessed element;

(v) determining an element in the queue having the same data type and lower priority factor than the accessed element after determining that there is no element in the queue having the same data type and priority factor as the accessed element; and wherein the program logic further includes means for modifying the exit point to address the determined element.

16. The system of claim 11, wherein the data structures in the memory device further include a table including an entry for each first factor and second factor pair, wherein there is at least a one-to-one correspondence between entries in the table and entry points in the queue for each first and second factor pair, wherein the program logic locates the entry point by locating the entry in the table corresponding to the first and second factor pair and determining the pointer for the located table entry addressing the entry point in the queue.

17. The system of claim 16, wherein the program logic inserts the received element by:

determining the table entry point for the first and second factor pair associated with the received element;

inserting the received element at the point in the queue addressed by the pointer for the determined table entry point; and modifying the pointer for the determined table entry point to address the inserted element.

18. The system of claim 11, further including a printer, wherein the elements comprise pointers to print files that have not been transformed into output data streams capable of being read by a printer, wherein the program logic further includes:

means for determining whether a transform process is available;

means for accessing an element in the queue after determining the availability of a transform process;

means for processing the accessed element to locate a print file to which the element points;

means for transmitting the located print file to the available transform process to transform the print file into an output data stream; and transmitting the output data stream to the printer for printing.

19. The system of claim 11, wherein the elements in the queue comprise pointers to output data streams that are the result of a transform process on a print file, and wherein the data structures include logical printer data structures grouping physical printers having a common set of print attributes, wherein the program logic further includes:

means for accessing an element in the queue according to the priority indicated by the first and second factors;

means for determining a logical printer having a set of print attributes compatible with print attributes of the accessed element;

means for processing the element to locate the output data stream to which the element points;

means for determining whether a physical printer grouped by the logical printer is available; and means for transferring the located output data stream to a physical printer grouped by the logical printer after determining that a physical printer grouped by the logical printer is available.

20. The system of claim 11, wherein the elements comprise pointers to output data streams that are the result of a transform process on a print file, wherein the queue is a logical printer queue, and wherein the data structures include a logical printer data structure grouping physical printers having a common set of print attributes, wherien the program logic further includes:

means for determining whether a physical printer grouped by the logical printer data structure is available;

means for accessing an element in the logical printer queue after determining the availability of a physical printer;

processing the accessed element to locate the output data stream to which the element points; and means for transferring the located output data stream to the physical printer for printing.

21. An article of manufacture for use in processing a queue of elements, the article of manufacture comprising computer readable storage media including at least one computer program embedded therein that causes a processing unit to perform the steps of:

receiving an element associated with a first factor and a second factor that indicates a priority of the element, wherein the element is a member of the set of elements consisting of a pointer to a file, a token reference to a file and a file;

providing entry points to a queue of elements, wherein for each first factor and second factor pair, an entry point addresses a point in the queue associated with the first factor and second factor;

locating an entry point addressing a point in the queue associated with a first factor and second factor that matches the first factor and second factor associated with the received element; and inserting the received element in the queue at the entry point.

22. The article of manufacture of claim 21, wherein the received elements are associated with additional factors, wherein for each additional factor, an entry point addresses a point in the queue.

23. The article of manufacture of claim 21, further comprising the steps of:

providing an exit point that addresses an element in the queue according to the priority of the elements in the queue;

processing a request for an element from the queue; and accessing the element addressed by the exit point to return to the request.

24. The article of manufacture of claim 21, wherein the first factor comprises a data type and the second factor comprises a priority within the data type, and wherein a priority ordering indicates the priority among the data types.

25. The article of manufacture of claim 21, wherein the exit point addresses an element having a highest priority data type of the elements in the queue and having a highest priority factor of the elements in the queue of the same data type, further comprising the steps of:

determining an element in the queue by performing the steps of:

(i) determining whether there is an element in the queue having the same data type as the accessed element;

(ii) determining an element in the queue having a data type that is lower priority than the data type of the accessed element after determining that there is no element in the queue having the same data type as the accessed object;

(iii) determining whether there is an element in the queue having the same priority factor as the accessed element after determining that there is an element in the queue having the same data type as the accessed element;

(iv) determining an element in the queue having the same data type and priority factor as the accessed element after determining that there is an element in the queue having the data type of the accessed element;

(v) determining an element in the queue having the same data type and lower priority factor than the accessed element after determining that there is no element in the queue having the same data type and priority factor as the accessed element; and modifying the exit point to address the determined element.

26. The article of manufacture of claim 21, wherein the step of providing entry points further comprises providing a table including an entry for each first factor and second factor pair, wherein there is at least a one-to-one correspondence between entries in the table and entry points in the queue for each first and second factor pair, and wherein the step of locating the entry point comprises locating the entry in the table corresponding to the first and second factor pair and determining the pointer for the located table entry addressing the entry point in the queue.

27. The article of manufacture of claim 26, wherein the step of inserting the received element in the queue comprises:

determining the table entry point for the first and second factor pair associated with the received data;

inserting the received element at the point in the queue addressed by the pointer for the determined table entry point; and modifying the pointer for the determined table entry point to address the inserted element.

28. The article of manufacture of claim 21, wherein the elements in the queue comprise pointers to print files that have not been transformed into output data streams capable of being read by a printer, further comprising the steps of:

determining whether a transform process is available;

accessing an element in the queue after determining the availability of a transform process;

processing the element to locate the print file to which the element points;

transmitting the located print file to the available transform process to transform the print file into an output data stream; and transmitting the output data stream to a printer for printing.

29. The article of manufacture of claim 21, wherein the elements in the queue comprise pointers to output data streams that are the result of a transform process on a print file, further comprising the steps of:

accessing an element in the queue according to the priority indicated by the first and second factors;

processing the element to locate the output data stream to which the element points;

determining a logical printer having a set of print attributes compatible with print attributes of the accessed element, wherein the logical printer groups physical printers having a common set of print attributes;

determining whether a physical printer grouped by the logical printer is available; and transferring the located output data stream to a logical printer queue after determining that a physical printer grouped by the logical printer is available.

30. The article of manufacture of claim 21, wherein the elements in the queue comprise pointers to output data streams that are the result of a transform process on a print file, wherein the queue is a logical printer queue, and wherein a logical printer groups physical printers having a common set of print attributes, further comprising the steps of:

determining whether a physical printer grouped by the logical printer is available;

accessing an element in the logical printer queue after determining the availability of a physical printer;

processing the element to locate the output data stream to which the element points; and transferring the output data stream to the physical printer for printing.

31. A memory device including a queue data structure queuing elements that is accessible to a processing unit, wherein the data structure is comprised of:

elements related to a file associated with a first factor and a second factor that indicates a priority of the element, wherein the element is a member of a set of elements consisting of a pointer to a file, a token reference to a file and a file; and entry points to the elements, wherein for each first factor and second factor pair, an entry point addresses a point in the queue associated with the first factor and second factor, wherein the processing unit locates an entry point addressing a point in the queue as associated with a first factor and second factor that matches the first factor and second factor associated with the received element, wherein the processing unit inserts the received element into the queue at the entry point.

32. The memory device of claim 31, further comprising an exit point that addresses an element in the queue according to the priority of the elements in the queue, wherein the processing unit processes a request for an element from the queue; and in response thereto accesses the element addressed by the exit point to return to the request.

33. The memory device of claim 31, wherein the first factor comprises a data type and the second factor comprises a priority within the data type, and wherein a priority ordering indicates the priority among the data types.

* * * * *